Sept. 30, 1947.  T. C. JONES  2,428,281
REAR AXLE SUPPORT FOR A FOUR WHEEL DRIVE
Filed Dec. 27, 1944

INVENTOR.
Thomas C. Jones
BY Harry Langsam
attorney

Patented Sept. 30, 1947

2,428,281

UNITED STATES PATENT OFFICE 2,428,281

REAR AXLE SUPPORT FOR A FOUR-WHEEL DRIVE

Thomas C. Jones, Philadelphia, Pa.

Application December 27, 1944, Serial No. 569,941

1 Claim. (Cl. 180—42)

My invention relates to a vehicle and relates particularly to a four wheel drive for motor vehicles.

Heretofore, four wheel drives have been used but difficulty has been experienced in suspending the body over the wheels of the vehicle. In my invention I control the rear wheels for steering the vehicle; this permits using a shorter turning radius than with the front wheel control.

It is therefore, an object of my invention to provide in a vehicle the use of the rear wheels for sustaining the weight of the vehicle, and to direct the turning of the vehicle by steering the rear wheels.

Another object of my invention is to provide in a vehicle a four wheel drive wherein the vehicle is steered by turning the rear wheels.

Other objects of my invention are to provide an improved device of the character described, that is easily and economically produced, which is sturdy in construction, and which is highly efficient in operation.

With the above and related objects in view, my invention consists in the details of construction and combination of parts, as will be more fully understood from the following description, when read in conjunction with the accompanying drawing in which.

Figure 1:
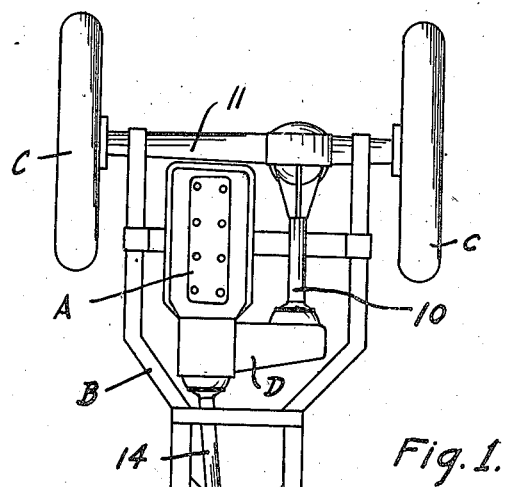
Fig. 1 is a plan view of a motor vehicle embodying my invention.

Referring now in detail to the drawing wherein similar reference characters refer to similar parts, I show in Fig. 1 a vehicle wherein a power plant, generally designated as A, is suspended from a frame, generally designated as B. The frame is suspended upon wheels and tires of the customary constructions, each of the front wheels is generally designated as C, and each of the rear wheels is generally designated as C1.

Figure 3:
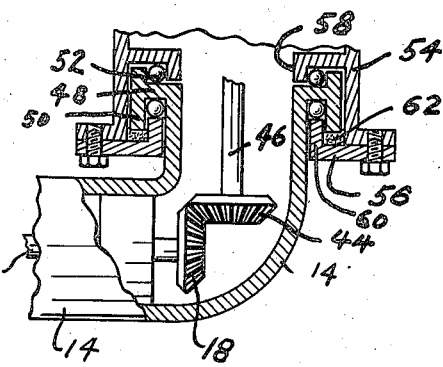
Fig. 3 is a fragmentary sectional view showing the gear arrangement for transmitting power to the rear wheels taken along the lines 3—3 of Fig. 1.
Figure 2:
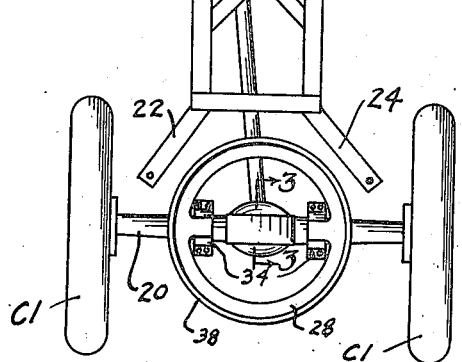
Fig. 2 is a fragmentary rear end view of the vehicle which embodies my invention.
Figure 4:
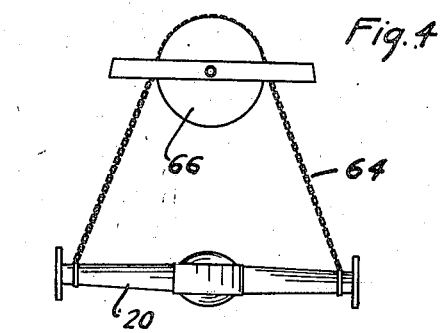
Fig. 4 is a fragmentary view showing mechanism for controlling the rear wheels so that they normally will travel in a forward direction.

The power plant A of the customary construction is connected to a controlled transmission, generally designated as D, which comprises the customary controlling gear shifts. A drive shaft 10, is connected to the transmission D, and the drive shaft is connected to the front wheels C through a differential set of gears which are located in the front housing. The shaft 10 is connected to the front wheels by virtue of the differential gear box of the customary construction. Also, connected to the drive shaft of the power plant is a second drive shaft, 13, which is located within a housing 14; the second drive shaft rotates the rear wheels C1. The rear wheel drive shaft 13, within the housing 14, has connected at one end thereto a beveled gear 18 (see Fig. 3). The drive shaft 13 is located underneath a rear axle housing 20, but it may be above the housing.

The body (not shown) of the vehicle is supported on the frame B and the front and rear wheels. The frame B does not interfere with the rotation either to the right or to the left of the rear wheels C1 because of the hereinafter described construction.

The rear of the frame B has two diverging beams 22, 24 which has suitable openings therein for the reception of a holding bolt 21. The holding bolts attach the arm 22 and 24 to a pair of split rings 25, 26 which revolve on ball bearings 27, that are supported on a circular bearing raceway 28, the raceway being supported on the rear axle casing 20 by means of supporting straps and supports 34. The rings 25, 26 revolve about and with respect to the ring 28.

The rear wheels C1, C1 are supported upon axles (not shown) which are located within the rear axle housing 20. On the outside of the rear housing 20 are two embracing straps 34, 34 that support the circular bearing raceway 28. The bearing raceway 28 has a horizontal ringlike bearing member to take the vertical thrust on the bearings 27 and a vertical peripheral flange 38, integrally formed with the horizontal bearing, which vertical flange takes the horizontal thrust of the bearings 27. The upper ring 25 has a vertical flange 40 to take the horizontal thrust on the upper bearings 27, and the lower ring 26 has a vertical flange 42 to take the horizontal thrust of the bearings on the lower side of the bearing raceway 28. It is to be noted that the flanges 40 and 42 are spaced from and parallel to the flange 38.

As the drive shaft 13 rotates the beveled gear 18, another meshed bevel gear 44 rotates a shaft 46 which in turn is geared to the axle (not shown of the wheels C1) in order to rotate the wheels C1.

When the rear wheels C1 are oscillated for steering purposes, the entire rear housing 20 oscillates with respect to the drive shaft housing 14 in a manner hereinafter described. Upon the end of the housing 14 is a horizontal bearing support 48 which has a vertically extending flange 50. Ball bearings 52 over and below the support 48 are in engagement with oscillatory members 54, 56 of the rear housing. The member 54 has a vertically extending flange 58 which forms part of the housing for the ball bearings 52 and the member 56 has a vertically extending flange 60 to engage the ball bearing 52—suitable packing 62 retains a lubricant.

The rear wheels may be rotated by a worm and wheel arrangement of the customary construction.

The cable 64 partially encircling idler wheel 66, which is located on the frame B, tends to keep the wheels C1, C1 in line with wheel C, C except when the steering apparatus (not shown) turns the wheel 66.

In operation my invention enables the vehicle to turn around corners wherein there is a short radius of curvature. This takes place by virtue of the fact that the rear wheels C1, C1 are turned so that the right hand wheel C, provided a right hand turn is to be made, serves as a pivot about which the left hand wheel rotates when the wheels C1, C1 are turned for a right hand turn.

When the power plant A is in operation then the transmission D may actuate the drive shaft 13 in the housing 14 to rotate the wheels C1, C1. The drive shaft and its housing is shown to be beneath the rear drive shaft housing 20, but it may just as easily be placed above the housing 20. It is to be noted that the rear wheel housing 20 may be rotated for steering purposes and as it is rotated it also serves as a support for the frame or chassis B, since it carries the support 28 so that any load on the frame or chassis B is transferred to ring 28 in order that the load may be carried by the rear wheels without in any manner hindering the rotation of the rear wheels.

Although my invention has been described in considerable detail, such description is intended as illustrative rather than limiting, since the invention may be variously embodied and the scope of the invention is to be determined as claimed.

I claim as my invention:

In a motor vehicle, a chassis, a rear axle housing, rear wheels, means within said housing to rotate said rear wheels, a ring-like member supported from the outside of said housing, an integrally formed vertical flange extending above and below said ring-like member, a second ring-like member mounted upon said first named ring-like member, a pair of vertical flanges mounted upon said second member and overlapping said vertical flange, and means to support a load on said chassis upon said rear wheel housing.

THOMAS C. JONES.

REFERENCES CITED

The following references are of record in the file of this patent:

UNITED STATES PATENTS

| Number | Name | Date |
| --- | --- | --- |
| 1,170,717 | Williams | Feb. 8, 1916 |
| 1,342,861 | Morton | June 8, 1920 |
| 1,405,159 | Polaski et al. | Jan. 31, 1922 |
| 1,188,885 | Bohan | June 27, 1916 |